US008323538B2

(12) United States Patent
Ogomi et al.

(10) Patent No.: US 8,323,538 B2
(45) Date of Patent: Dec. 4, 2012

(54) METHOD FOR PRODUCING POLARIZER

(75) Inventors: Daisuke Ogomi, Ibaraki (JP); Minoru Miyatake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 189 days.

(21) Appl. No.: 12/278,350

(22) PCT Filed: Nov. 27, 2007

(86) PCT No.: PCT/JP2007/072851
§ 371 (c)(1),
(2), (4) Date: Aug. 5, 2008

(87) PCT Pub. No.: WO2008/072468
PCT Pub. Date: Jun. 19, 2008

(65) Prior Publication Data
US 2009/0051058 A1 Feb. 26, 2009

(30) Foreign Application Priority Data

Dec. 8, 2006 (JP) .................................. 2006-332147

(51) Int. Cl.
*B29D 11/00* (2006.01)
(52) U.S. Cl. ........... 264/1.31; 264/1.6; 264/2.6; 264/2.7
(58) Field of Classification Search ................. 264/1.34, 264/1.31, 2.6, 2.7, 1.6
See application file for complete search history.

(56) References Cited

U.S. PATENT DOCUMENTS

| | | | |
|---|---|---|---|
| 5,327,285 A * | 7/1994 | Faris | 359/483 |
| 7,651,643 B2 | 1/2010 | Saiki et al. | |
| 2004/0212885 A1 * | 10/2004 | Mizushima et al. | 359/497 |
| 2006/0227423 A1 | 10/2006 | Saiki et al. | |
| 2010/0085641 A1 | 4/2010 | Saiki et al. | |

FOREIGN PATENT DOCUMENTS

| | | |
|---|---|---|
| JP | 10-142422 A | 5/1998 |
| JP | 10-160935 A | 6/1998 |
| JP | 2000-319533 A | 11/2000 |
| JP | 2002-155275 A | 5/2002 |
| JP | 2003-270440 A | 9/2003 |
| JP | 2004-93993 A | 3/2004 |
| JP | 2004-294808 A | 10/2004 |
| JP | 2004-341503 A | 12/2004 |
| JP | 2006-215464 A | 8/2006 |

OTHER PUBLICATIONS

Notification of Transmittal of Translation of the International Preliminary Report on Patentability (Form PCT/IB/338) of International Application No. PCT/JP2007/072851 mailed Jun. 18, 2009 with Forms PCT/IB/373 and PCT/ISA/237.
International Search Report of PCT/JP2007/072851, date of mailing Mar. 18, 2008.
Japanese Office Action dated Jan. 13, 2012, issued in corresponding Japanese Patent Application No. 2007-303250.
Japanese Office Action dated May 9, 2012, issued in corresponding Japanese Patent Application No. 2007-303250, with English Translation.

\* cited by examiner

*Primary Examiner* — Mathieu D. Vargot
(74) *Attorney, Agent, or Firm* — Westerman, Hattori, Daniels & Adrian, LLP

(57) ABSTRACT

A method for producing a polarizer of the present invention comprises: subjecting a polyvinyl alcohol film to at least a dyeing process, a crosslinking process and a stretching process; and then subjecting the polyvinyl alcohol film to a washing process with an aqueous solution containing 1 to 50% by weight of an alcohol and 0.5 to 10% by weight of an iodide compound. A polarizer produced by the production method has high transmittance and high degree of polarization.

16 Claims, No Drawings

METHOD FOR PRODUCING POLARIZER

TECHNICAL FIELD

The present invention relates to a method for producing a polarizer and to the polarizer produced by the production method. The present invention also relates to a polarizing plate and an optical film each using the polarizer and to an image display device, such as a liquid crystal display device, an organic electroluminescence (EL) display device and a plasma display panel (PDP), using the polarizer, the polarizing plate or the optical film.

BACKGROUND ART

Liquid crystal displays are used for personal computers, TVs, monitors, cellular phones, PDAs, and so on. Dyed polyvinyl alcohol films have been used for polarizers of liquid crystal displays and so on, because they have a high level of both transmittance and degree of polarization. For example, such polarizers are produced by a process that includes subjecting a polyvinyl alcohol film to each of swelling, dyeing, crosslinking, and stretching processes in a bath, then subjecting the film to a washing process, and then drying the film. Such polarizers are generally used in the form of polarizing plates, which are each composed of a polarizer and a protective film, such as a triacetylcellulose film, bonded to one or both sides of the polarizer with an adhesive.

In recent years, liquid crystal displays have become more sophisticated, and liquid crystal panels are required to have higher contrast such that high visibility can be achieved. Specifically, blacker in black viewing and whiter and brighter in white viewing are desired, and, therefore, further improvement in the polarization performance of polarizers is required. Accordingly, satisfying both high degree of polarization and high transmittance has become very important for polarization performance.

In order to obtain such polarizers, a large number of methods have been proposed. For example, a proposed method for producing polarizers includes subjecting a polyvinyl alcohol film to each of swelling, dyeing, crosslinking, and stretching processes, then subjecting the film to iodide ion treatment as a washing process, and then immersing the film in an alcohol solution (see Patent Literature 1). According to Patent Literature 1, the moisture percentage of polarizers can be reduced without heating, and drying are possible with no degradation in the optical properties of polarizers. Although the immersion in alcohol can improve the hue of polarizers and the drying efficiency according to Patent Literature 1, however, further improvement in performance is still desired with respect to the optical properties of polarizers.

Patent Literature 1: JP-A No. 2003-270440

DISCLOSURE OF INVENTION

Objects to be Solved by the Invention

An object of the present invention is to provide a method for producing a polarizer having high transmittance and high degree of polarization.

Another object of the present invention is to provide such a polarizer produced by such a production method, a polarizing plate using such a polarizer, and an optical film using such a polarizer. A further object of the present invention is to provide an image display device using such a polarizer, polarizing plate and optical film.

Means for Solving the Problems

As a result of intensive investigations for solving the problems described above, the inventors have found that the objects can be achieved by the polarizer producing method described below and so on, and the present invention has been completed.

The present invention relates to a method for producing a polarizer, comprising:
subjecting a polyvinyl alcohol film to at least a dyeing process, a crosslinking process and a stretching process; and
then subjecting the polyvinyl alcohol film to a washing process with an aqueous solution containing 1 to 50% by weight of an alcohol and 0.5 to 10% by weight of an iodide compound.

In the method for producing a polarizer, as the alcohol, at least one alcohol having 1 to 4 carbon atoms is preferably used.

The present invention also related to a polarizer produced by the above production method.

The present invention also related to a polarizing plate comprising the above polarizer and a transparent protective film provided on at least one side of the polarizer.

The present invention also related to an optical film comprising a laminate comprising at least one piece of the above polarizer.

The present invention also related to an image display device comprising at least one piece of the above polarizer.

Effects of the Invention

In the method of the present invention for producing a polarizer, at least a dyeing process, a crosslinking process and a stretching process are performed, and then a washing process is performed with an aqueous solution containing specific amounts of an alcohol and an iodide compound. The alcohol and iodide ion derived from the iodide compound coexist in the aqueous solution. The washing process with the aqueous solution in such a state allows the production of a polarizer with a high level of both transmittance and degree of polarization. In addition, the resulting polarizer can achieve low crossed transmittance in a wide band; especially have a good black viewing. The washing process according to the present invention is also preferred in view of workability, because alcohol treatment and iodide ion impregnation treatment can be performed at the same time.

When a polarizer is bonded to a transparent protective film with an adhesive layer produced from an electron beam-curable adhesive, cracking can easily occur in the resulting polarizing plate, which comprises the polarizer and the transparent protective film provided thereon. Particularly when (meth)acrylic resin is used for the transparent protective film, cracking can easily occur in the resulting polarizing plate. The production method of the present invention is effective in solving such a problem, and cracking can be suppressed in polarizing plates produced with the polarizer obtained by the production method of the present invention.

DETAILED DESCRIPTION OF THE INVENTION

In an embodiment of the present invention, a polyvinyl alcohol film that is optically-transparent in the visible light range and capable of dispersing or adsorbing a dichroic material such as iodine or a dichroic dye is, but not limited to, used for a polarizer. The polyvinyl alcohol film to be used generally has a thickness of about 10 to about 300 μm, preferably of 20 to 100 μm.

For example, polyvinyl alcohol films that have been conventionally used for polarizers are preferably used. Examples of materials for the polyvinyl alcohol film include polyvinyl alcohol and derivatives thereof. Examples of polyvinyl alcohol derivatives include polyvinyl formal and polyvinyl acetal and those modified with olefins such as ethylene and propylene, those modified with unsaturated carboxylic acids such as acrylic acid, methacrylic acid and crotonic acid, those modified with alkyl esters of unsaturated carboxylic acids, and those modified with acrylamide or the like. The degree of polymerization of the polyvinyl alcohol is preferably from about 100 to about 10,000, more preferably from 1,000 to 10,000. The degree of saponification of the polyvinyl alcohol is generally from about 80 to about 100% by mole.

Other examples of the polyvinyl alcohol film include hydrophilic polymer films such as partially-saponified ethylene-vinyl acetate copolymer films; and oriented films of polyenes such as dehydration products of polyvinyl alcohol and dehydrochlorination products of polyvinyl chloride.

The polyvinyl alcohol film may also contain an additive such as a plasticizer and a surfactant. Examples of the plasticizer include polyols and condensates thereof, such as glycerol, diglycerol, triglycerol, ethylene glycol, propylene glycol, and polyethylene glycol. The plasticizer is, but not limited to, preferably used at a concentration of 20% by weight or less in the polyvinyl alcohol film.

In an embodiment of the present invention, the polyvinyl alcohol film is subjected to a dyeing process, a crosslinking process and a stretching process.

The dyeing process may be performed by allowing iodine or a dichroic dye to adsorb to and align in the polyvinyl alcohol film. The dyeing process may be performed together with the stretching process. The dyeing is generally performed by immersing the film in a dye solution. The dye solution is generally an iodine solution. For an aqueous iodine solution used as the iodine solution, an aqueous solution in which iodine and iodine ion, which is auxiliary agent, is contained from an iodide compound is used. Examples of the iodide compounds that may be used include potassium iodide, lithium iodide, sodium iodide, zinc iodide, aluminum iodide, lead iodide, copper iodide, barium iodide, calcium iodide, tin iodide, and titanium iodide. The iodide compound is preferably potassium iodide. In an embodiment of the present invention, examples of the iodide compound described above may be also used in other processes.

The concentration of iodine in the iodine solution may be from about 0.01 to about 1% by weight, preferably from 0.02 to 0.5% by weight. The concentration of the iodide compound may be from about 0.1 to about 10% by weight, preferably from 0.2 to 8% by weight. In the iodine dyeing, the temperature of the iodine solution is generally from about 20 to about 50° C., preferably from 25 to 40° C., and the immersion time is generally from about 10 to about 300 seconds, preferably from 20 to 240 seconds.

The crosslinking process is generally performed using a boron compound as a crosslinking agent. The order of crosslinking process may be not limited to perform. The crosslinking process may be performed together with the stretching process. The crosslinking processes may be performed twice or more times. The boron compound may be boric acid, borax or the like. The boron compound is generally used in the form of an aqueous solution or a water-organic solvent mixture solution. An aqueous solution of boric acid is typically used. The concentration of boric acid in the aqueous boric acid solution may be from about 2 to about 15% by weight, preferably from 3 to 13% by weight. In order to provide heat resistance depending on the degree of crosslinkage, the above concentration of boric acid is preferably used. The aqueous boric acid solution or the like may also contain an iodide compound such as potassium iodide, or the like. When the aqueous boric acid solution contains an iodide compound, the concentration of the iodide compound may be from about 0.1 to about 10% by weight, preferably from 0.2 to 5% by weight.

The crosslinking process may be performed by immersing the polyvinyl alcohol film in an aqueous boric acid solution or the like. Alternatively, the boron compound or the like may be applied to the polyvinyl alcohol film by a coating method, a spraying method, or the like. In the crosslinking process, the treatment temperature is generally 25° C. or higher, preferably from 30° C. to 85° C., more preferably from 30° C. to 60° C., and the treatment time is generally from 5 to 800 seconds, preferably from 8 to 500 seconds.

The stretching process is generally performed by uniaxial stretching. The stretching process may be performed together with the dyeing process or the crosslinking process. While the stretching process may use any of a wet stretching method and a dry stretching method, a wet stretching method is preferably used. For example, a wet stretching method is typically performed after the dyeing process. Stretching may also be performed together with the crosslinking process. In the case of dry stretching, examples of the stretching method include an inter-roll stretching method, a heated roll stretching method, and a compression stretching method. In the stretching method, the film to be stretched is generally kept in a heated state. The stretching process may also be performed in a multi-stage manner.

The wet stretching method may use a treatment liquid containing an iodide compound. When an iodide compound-containing treatment liquid is used, the concentration of the iodide compound is preferably from about 0.1 to about 10% by weight, more preferably from 0.2 to 5% by weight. In the wet stretching method, the treatment temperature is generally 25° C. or higher, preferably from 30 to 85° C., more preferably from 30 to 60° C., and the immersion time is generally from 10 to 800 seconds, preferably from 30 to 500 seconds.

In the stretching process, the polyvinyl alcohol film may be stretched such that the total stretch ratio reaches 3 to 17, preferably 4 to 10 times, more preferably 4 to 8 times, based on the original length. That is, when stretching is also performed in other processes such as the swelling process described later, the total stretch ratio means the sum total of stretch ratios over the processes. The total stretch ratio may be appropriately determined taking into account the stretch ratio in other processes such as the swelling process so on. If the total stretch ratio is low, the orientation is insufficient so that it can be difficult to obtain a polarizer with a high level of optical properties (a high degree of polarization). On the other hand, if the total stretch ratio is too high, breakage can easily occur during stretching, or the resulting polarizer can be so thin that the workability can be low in the following process.

In the method of the present invention for producing a polarizer, which includes at least the dyeing process, the crosslinking process and the stretching process, a swelling process may be further performed before carrying out the dyeing process. The swelling process is effective in washing dirt or an anti-blocking agent from the surface of the polyvinyl alcohol film. The process of allowing the polyvinyl alcohol film to swell is also effective in preventing unevenness such as uneven dyeing or the like.

For a treatment liquid used in the swelling process, water, distilled water or pure water is generally used. The treatment liquid may contain a small amount of an iodide compound, an additive such as a surfactant, an alcohol, or the like, as long as the treatment liquid is mainly composed of water. When the treatment liquid contains the iodide compound, the concentration of the iodide compound is preferably from about 0.1 to about 10% by weight, more preferably from 0.2 to 5% by weight.

In the swelling process, the treatment temperature is generally adjusted to about 20 to about 45° C., more preferably to 25 to 40° C. When uneven swelling is performed, unevenly swelling portions can result in unevenly dyed portions in the dyeing process, and thus the uneven swelling should be prevented. The immersion time is generally from about 10 to about 300 seconds, preferably from 20 to 240 seconds.

In the swelling process, stretching may be performed as needed. The stretch ratio is generally 6.5 times or less based on the original length of the polyvinyl alcohol film. In view of optical properties, the stretch ratio is preferably from 1.2 to 6.5 times, more preferably from 2 to 4 times, even more preferably 2 to 3 times. By stretching is performed in the swelling process, the stretching in the stretching process performed after the swelling process may be controlled to be small so as not to cause breakage of the film. On the other hand, if the stretch ratio is too high in the swelling process, the stretch ratio is held to be low in the stretching process, which is not preferred in view of optical properties particularly when the stretching process is performed after the crosslinking process.

In the method of the present invention for producing a polarizer, the washing process is performed after at least the dyeing process, the crosslinking process and the stretching process are performed. Before the washing process, metal ion treatment may be further performed in addition to the processes described above. The metal ion treatment may be performed by immersing the polyvinyl alcohol film in an aqueous solution containing a metal salt. The metal ion treatment allows the impregnation of the polyvinyl alcohol film with various metal ions.

Particularly in order to control the color tone or to impart durability, ions of transition metal such as cobalt, nickel, zinc, chromium, aluminum, copper, manganese, or iron are preferably used. From the viewpoints of adjusting the color tone and imparting durability, zinc ions are particularly preferred. Examples of zinc salts include zinc halides such as zinc chloride and zinc iodide, and zinc sulfate and zinc acetate.

The metal ion treatment may use a metal salt solution. Zinc impregnation treatment using an aqueous zinc salt solution is described below as a typical example of the metal ion treatment.

The concentration of zinc ion in the aqueous zinc salt solution may be from about 0.1 to about 10% by weight, preferably from 0.3 to 7% by weight. An aqueous zinc salt solution containing potassium ion and iodide ion derived from potassium iodide or the like is preferably used, because it can facilitate the zinc ion impregnation. The concentration of potassium iodide in the zinc salt solution is preferably from about 0.1 to about 10% by weight, more preferably from 0.2 to 5% by weight.

In the zinc impregnation treatment, the temperature of the zinc salt solution is generally from about 15 to about 85° C., preferably from 25 to 70° C., and the immersion time is generally within the range from about 1 to about 120 seconds, preferably from 3 to 90 seconds. In the zinc impregnation treatment, the conditions such as the concentration of the zinc salt solution and the temperature or time of immersion of the polyvinyl alcohol film in the zinc salt solution may be controlled such that the zinc content of the polyvinyl alcohol film can fall within the range described above. Timing of the zinc impregnation treatment is not particularly limited. The zinc salt may coexist in the dyeing bath, the crosslinking bath or the stretching bath so that the zinc impregnation treatment may be performed simultaneously with the dyeing process, the crosslinking process or the stretching process.

In the method of the present invention for producing a polarizer, the washing process is performed after at least the dyeing process, the crosslinking process and the stretching process are performed as described above.

The washing process uses an aqueous solution containing a specific concentration of each of an alcohol and an iodide compound. The alcohol is preferably hydrophilic, particularly preferably miscible with water in any ratio, at room temperature (25° C.). Such an alcohol is preferably an alcohol having 1 to 4 carbon atoms, more preferably an alcohol having 1 to 3 carbon atoms. Examples of such an alcohol include liquid alcohols such as methanol, ethanol, n-propanol, isopropanol, n-butanol, isobutanol, sec-butanol, and tert-butanol. In particular, ethanol is preferred. One or more alcohols may be used alone or in combination. Two or more alcohols may be mixed in any ratio. For example, an alcohol mixture of ethanol and isopropanol in any ratio may be used.

The concentration of the alcohol in the aqueous solution used for the washing process is from 1 to 50% by weight. From the viewpoint of obtaining a polarizer with high transmittance and high degree of polarization, the concentration of the alcohol is preferably from 2 to 40% by weight, more preferably from 2 to 30% by weight, even more preferably from 3 to 20% by weight, still more preferably from 5 to 10% by weight. On the other hand, in view of the effect of suppressing cracking in the polarizing plate produced with an electron beam-curable adhesive, the concentration of the alcohol is preferably from 5 to 50% by weight, more preferably from 10 to 50% by weight, even more preferably from 30 to 50% by weight. The concentration of the iodide compound is generally from 0.5 to 10% by weight, preferably from 1 to 5% by weight, more preferably from 2 to 4% by weight. In order to achieve the effects of the present invention, the aqueous solution contains the alcohol and the iodide compound at specific concentrations. If the alcohol concentration is more than 50% by weight or if the iodide compound concentration is more than 10% by weight, the crossed transmittance cannot be controlled to be low in a wide band.

The washing process may be performed by immersing the polyvinyl alcohol film in the aqueous solution. In the washing process, the temperature of the aqueous solution is generally within the range from 5 to 50° C., preferably from 10 to 45° C., more preferably from 15 to 40° C., and the immersion time is generally about 1 to about 200 seconds, preferably from 5 to 100 seconds, more preferably from 7 to 15 seconds. The washing process with the aqueous solution may be performed in combination with water washing or may be performed before or after water washing.

After the processes described above are each completed, a drying process may be finally performed and the polarizer is thus obtained. The drying time and the drying temperature in the drying process are each appropriately set depending on the desired moisture percentage of the polarizer (film) to be obtained. The drying temperature is generally controlled to be within the range from 20 to 150° C., preferably from 40 to 100° C. If the drying temperature is too low, the drying time can be undesirably long so that it can be impossible to perform efficient production. If the drying temperature is too high, a degraded polarizer can be obtained which has degraded optical properties and due. The time of drying by heating is generally from about 1 to about 5 minutes.

According to conventional techniques, a transparent protective film may be provided on at least one side of the resulting polarizer to form a polarizing plate. The transparent protective film may be provided as a polymer coating layer or a layer provided lamination. Any appropriate transparent material such as a transparent polymer or a film material may be used to form the transparent protective film. Materials excellent in transparency, mechanical strength, thermal stability, and water-blocking properties are preferably used.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth) acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth) acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

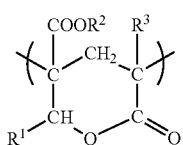

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 µm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: $nx=ny>nz$, $nx>ny=nz$, $nx>ny=nz$, $nx>nz>ny$, $nz=nx>ny$, $nz>nx>ny$, or $nz>nx=ny$ may be selected and used depending on various applications. The relation $ny=nz$ includes not only the case where ny is completely equal to nz but also the case where ny is substantially equal to nz.

For example, the retardation plate satisfying the relation $nx>ny>nz$ to be used preferably has a in-plane retardation of 40 to 100 nm, a thickness retardation of 100 to 320 nm, and an Nz coefficient of 1.8 to 4.5. For example, the retardation plate satisfying the relation $nx>ny=nz$ (positive A plate) to be used preferably has a in-plane retardation of 100 to 200 nm. For example, the retardation plate satisfying the relation $nz=nx>ny$ (negative A plate) to be used preferably has a in-plane retardation of 100 to 200 nm. For example, the retardation plate satisfying the relation $nx>nz>ny$ to be used preferably has a in-plane retardation of 150 to 300 nm and an Nz coefficient of more than 0 and not more than 0.7. As described above, for example, the retardation plate satisfying the relation $nx=ny>nz$, $nz>nx>ny$ or $nz>nx=ny$ may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of $nx>ny=nz$, $nx>ny>nz$, $nx>nz>ny$, or $nx=ny>nz$ (positive A-plate, biaxial, negative C-plate) is preferred. In VA mode, a combination of positive A-plate and negative C-plate or single use of biaxial film is preferably used. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, $nx>ny=nz$, $nx>nz>ny$, $nz>nx=ny$, or $nz>nx>ny$ (positive A-plate, biaxial, negative C-plate) is preferred.

The film with retardation may be separately prepared and laminated to a transparent protective film with no retardation so that the function described above can be provided.

The transparent protective film may be subjected to surface modification treatment to increase adhesion for the polarizer before it is applied with the adhesive. Specific examples of such treatment include corona treatment, plasma treatment, flame treatment, ozonation, primer treatment, glow treatment, saponification treatment, and coupling agent treatment. And an appropriate antistatic layer may be formed.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

The polarizer may be bonded to the transparent protective film with an adhesive. Examples of such an adhesive include isocyanate adhesives, polyvinyl alcohol adhesives, gelatin adhesives, vinyl latexes, and aqueous polyesters. The adhesive is generally used in the form of an aqueous solution, which generally has a solids content of 0.5 to 60% by weight. In the adhesive used in the present invention may contain a metal compound filler.

Besides the above, an active energy ray-curable adhesive such as an ultraviolet-curable adhesive or an electron beam-curable adhesive may also be used as the adhesive to bond the polarizer to the transparent protective film. Electron beam-curable adhesives for polarizing plates exhibit good adhesion to the transparent protective film, especially to (meth)acrylic resins.

A (meth)acryloyl group-containing compound, particularly N-substituted amide monomer may be used as a curable component of the active energy ray-curable adhesive. Such a curable component is preferred in view of durability and particularly suitable for electron beam-curable adhesives. For example, such electron beam-curable adhesives also exhibit good adhesion to low-moisture-percentage polarizers or to protective films produced with low-moisture-permeability materials, and as a result, polarizing plates with good dimensional stability can be obtained with such adhesives.

The use of the curable component described above allows the production of polarizing plates whose dimensions are less changeable and thus can facilitate upsizing of polarizing plates and keep the manufacturing cost low in terms of yield and the number of available pieces. In addition, the polarizing plate obtained according to the present invention has good dimensional stability and thus can reduce unevenness caused by external heat from a backlight in an image display device.

The curable component may be a (meth)acryloyl group-containing compound or a vinyl group-containing compound. Any of a monofunctional curable component and a bifunctional or polyfunctional curable component may be used. One or more curable components may be selected and used singly or in combination so as to produce an adhesive layer with a Tg of 60° C. or more. The curable component is preferably a (meth)acryloyl group-containing compound. An N-substituted amide monomer is preferably used as the (meth)acryloyl group-containing compound. Such a monomer is preferred in view of adhesion. The term "(meth)acryloyl group" means acryloyl group and/or methacryloyl group. As used herein, "meth" has the same meaning as described above.

The N-substituted amide monomer may be represented by the general formula (1): $CH_2=C(R^1)-CONR^2(R^3)$, wherein $R^1$ represents a hydrogen atom or a methyl group, $R^2$ represents a hydrogen atom or a straight or branched chain alkyl group having 1 to 4 carbon atoms and optionally having a hydroxyl group, a mercapto group, an amino group, or a quaternary ammonium group, and $R^3$ represents a hydrogen atom or a straight or branched chain alkyl group having 1 to 4 carbon atoms, provided that $R^2$ and $R^3$ are not simultaneously a hydrogen atom, or $R^2$ and $R^3$ are bonded to form a five-membered or six-membered ring optionally having an oxygen atom. Concerning $R^2$ or $R^3$ in the general formula (1), the straight or branched chain alkyl group of 1 to 4 carbon atoms may be methyl, ethyl, isopropyl, or tert-butyl; the hydroxyl group-containing alkyl group may be hydroxymethyl or hydroxyethyl; and the amino group-containing alkyl group may be aminomethyl or aminoethyl. Alternatively, $R^2$ and $R^3$ may be bonded to form an optionally oxygen atom-containing five- or six-membered ring, which may include a nitrogen-containing heterocyclic ring. Examples of the heterocyclic ring include a morpholine ring, a piperidine ring, a pyrrolidine ring, and a piperazine ring.

Examples of the N-substituted amine monomer include N-methyl(meth)acrylamide, N,N-dimethyl(meth)acrylamide, N,N-diethyl(meth)acrylamide, N-isopropylacrylamide, N-butyl(meth)acrylamide, N-hexyl(meth)acrylamide, N-methylol(meth)acrylamide, N-hydroxyethyl(meth)acrylamide, N-methylol-N-propane(meth)acrylamide, aminomethyl(meth)acrylamide, aminoethyl(meth)acrylamide, mercaptomethyl(meth)acrylamide, and mercaptoethyl(meth)acrylamide. Examples of the heterocyclic ring-containing monomer include N-acryloylmorpholine, N-acryloylpiperidine, N-methacryloylpiperidine, and N-acryloylpyrrolidine. One, or two or more of these N-substituted amide monomers may be used singly or in combination.

The N-substituted amide monomer is preferably N-hydroxyethylacrylamide, N-methylolacrylamide, N-isopropylacrylamide, or N-acryloylmorpholine. N-substituted amide monomers exhibit good adhesion to low-moisture-percentage polarizers or transparent protective films produced with low moisture permeable materials. In particular, the monomers listed above exhibit good adhesion, and N-hydroxyethylacrylamide is particularly preferred.

One or two or more N-substituted amide monomers may be used singly or in any combination. When two or more N-substituted amide monomers are used in combination, N-hydroxyethylacrylamide is preferably used in combination with N-acryloylmorpholine in view of durability and adhesion. In the case of this combination, the content of N-hydroxyethylacrylamide is preferably 40% by weight or more based on the total amount of N-hydroxyethylacrylamide and N-acryloylmorpholine, in terms of achieving good adhesion. The content of N-hydroxyethylacrylamide is more preferably from 40 to 90% by weight, still more preferably from 60 to 90% by weight.

Besides the above, other (meth)acryloyl group-containing compounds for use as the curable component include a variety of epoxy (meth)acrylates, urethane (meth)acrylates, and polyester (meth)acrylates, and a variety of (meth)acrylate monomers. In particular, epoxy (meth)acrylates, specifically monofunctional (meth)acrylates having an aromatic ring and a hydroxy group are preferably used. If some of these curable components are incapable of forming an adhesive layer with a Tg of 60° C. or more by themselves, they should be used in combination with the N-substituted amide monomer.

The polarizing plate of the present invention is produced by bonding the transparent protective film to the polarizer with the adhesive. The adhesive may be applied to either or both of the transparent protective film and the polarizer. When the adhesive is other than the electron beam-curable adhesive, the lamination may be followed by the drying process so that the adhesive layer may be formed as a dried coating layer. The lamination of the polarizer and the transparent protective film may be performed using a roll laminator or the like. The thickness of the adhesive layer is generally, but not limited to, from about 30 to about 1,000 nm.

When the active energy ray-curable adhesive is used, the lamination of the polarizer and the transparent protective film may be followed by irradiation of active energy rays such as electron beams and ultraviolet rays so that the adhesive may be cured. The active energy rays may be irradiated in any appropriate direction. Preferably, the active energy rays are irradiated to the transparent protective film side. If they are irradiated to the polarizer side, the polarizer could be degraded by the active energy rays.

The active energy ray curing adhesive to be used is preferably an electron beam curing adhesive. Any appropriate conditions under which the adhesive can be cured may be used for the irradiation of an electron beam. For example, an electron beam is preferably irradiated at an accelerating voltage of 5 kV to 300 kV, more preferably of 10 kV to 250 kV. If the accelerating voltage is less than 5 kV, the electron beam can fail to reach the adhesive so that the curing can be insufficient. If the accelerating voltage is more than 300 kV, the degree of penetration through the object can be too high so that the electron beam can be reflected to damage the transparent protective film or the polarizer. The irradiation dose is preferably from 5 to 100 kGy, more preferably from 10 to 75 kGy. If the irradiation dose is less than 5 kGy, the adhesive can be insufficiently cured. An irradiation dose of more than 100 kGy can damage the transparent protective film or the polarizer and cause a reduction in mechanical strength or yellow discoloration so that the desired optical properties cannot be achieved.

In the polarizing plate obtained using the active energy ray curing adhesive, the adhesive layer has a thickness of 0.01 to 7 μm, preferably of 0.01 to 5 μm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

EXAMPLES

The present invention is more specifically described below using some examples and comparative examples.

Example 1

A 75 µm-thick polyvinyl alcohol film (2,400 in average degree of polymerization and 99.9% by mole in degree of saponification) was used as a raw film. The polyvinyl alcohol film was subjected to the respective processes in the order described below.
(Swelling Process)
Pure water was used as a treatment liquid in the swelling bath. The polyvinyl alcohol film was transferred to the swelling bath and immersed for 1 minute in the pure water adjusted to 30° C. so that it was allowed to swell.
(Dyeing Process)
A 3.2% by weight iodine dyeing solution containing iodine and potassium iodide (1:7 in weight ratio) was used as a treatment liquid in the dyeing bath. After the swelling treatment, the polyvinyl alcohol film was transferred to the dyeing bath and immersed for 30 seconds in the iodine dyeing solution adjusted to 30° C., while it was uniaxially stretched to 3.4 times (stretch ratio) based on the original length, so that the film was dyed.
(Crosslinking Process)
An aqueous boric acid solution containing 3% by weight of boric acid and 3% by weight of potassium iodide was used as a treatment liquid in the crosslinking bath. After the treatment described above, the polyvinyl alcohol film was transferred to the crosslinking bath and immersed for 10 seconds in the aqueous boric acid solution adjusted to 30° C., while it was uniaxially stretched such that the total stretch ratio reached 3.6 times based on the original length.
(Stretching Process)
An aqueous boric acid solution containing 4% by weight of boric acid and 5% by weight of potassium iodide was used as a treatment liquid in the stretching bath. After the treatment described above, the polyvinyl alcohol film was transferred to the stretching bath and immersed for 60 seconds in the aqueous boric acid solution adjusted to 60° C., while it was uniaxially stretched such that the total stretch ratio reached 6 times based on the original length.
(Washing Process)
An aqueous solution containing 3% by weight of potassium iodide and 7% by weight of ethanol was used as a treatment liquid in the washing bath (first washing bath). After the treatment described above, the polyvinyl alcohol film was transferred to the washing bath and immersed for 10 seconds in the aqueous solution adjusted to 30° C.
(Drying Process)
After the treatment described above, the polyvinyl alcohol film was dried for 4 minutes in an oven at 60° C. to obtain a polarizer.

Examples 2 to 15 and Comparative Examples 1 to 3

Polarizers were obtained under the same conditions as in Example 1, except that the concentration of the potassium iodide and the kind and concentration of the alcohol in the aqueous solution used as the treatment liquid in the first washing bath were changed as shown in Table 1.

Comparative Example 4

(Washing Process)
An aqueous solution containing 3% by weight of potassium iodide was used as a treatment liquid in a first washing bath. After the treatment described above, the polyvinyl alcohol film was transferred to the first washing bath and immersed for 10 seconds in the aqueous solution adjusted to 30° C. An aqueous solution containing 7% by weight of ethanol was used as a treatment liquid in a second washing bath. The film was then transferred to the second washing bath and immersed for 10 seconds in the aqueous solution adjusted to 30° C.
A polarizer was obtained under the same conditions as in Example 1, except that the washing process was changed as described above.

Comparative Example 5

A polarizer was obtained under the same conditions as in Comparative Example 4, except that the ethanol concentration of the treatment liquid in the second washing bath was changed to 99.5% by weight and that the immersion time was changed to 5 minutes.

Comparative Example 6

A polarizer was obtained under the same conditions as in Comparative Example 4, except that a 3.8% by weight iodine dyeing solution containing iodine and potassium iodide (1:7 in weight ratio) was used instead as the treatment liquid in the dyeing bath for the dyeing process, the ethanol concentration of the treatment liquid in the second washing bath was changed to 99.5% by weight, and the immersion time was changed to 5 minutes.

The optical properties of the resulting polarizers were determined by the methods described below.
(Methods for Determining the Optical Properties)
The optical properties of each polarizer were determined using an integrating sphere-equipped spectrophotometer (V7100 manufactured by JASCO Corporation). In the measurement of the transmittance for each linearly polarized light, the transmittance for completely polarized light obtained through a Glan-Taylor prism polarizer was normalized as 100%. The single-piece transmittance, parallel transmittance ($H_0$) and crossed transmittance ($H_{90}$) were measured at a wavelength of 550 nm, and the degree of polarization was determined from these values according to the formula below. These transmittances were Y values which had undergone luminosity correction in the two-degree visual field (C light source) according to JIS Z 8701. Degree of polarization (%)=$\{(H_0-H_{90})/(H_0+H_{90})\}^{1/2} \times 100$.

The crossed transmittance was also measured at wavelengths of 450 nm, 550 nm and 660 nm. These are shown as Tc450, Tc550 and Tc660 in Table 1.

TABLE 1

| | First Washing Bath Treatment Liquid | | | Second Washing Bath Treatment Liquid | | |
|---|---|---|---|---|---|---|
| | Potassium Iodide | Alcohol | | Potassium Iodide | Alcohol | |
| | Concentration (%) | Concentration (%) | Type | Concentration (%) | Concentration (%) | Type |
| Example 1 | 3 | 7 | Ethanol | — | — | — |
| Example 2 | 3 | 5 | Ethanol | — | — | — |
| Example 3 | 3 | 10 | Ethanol | — | — | — |
| Example 4 | 3 | 20 | Ethanol | — | — | — |
| Example 5 | 3 | 30 | Ethanol | — | — | — |
| Example 6 | 2 | 7 | Ethanol | — | — | — |
| Example 7 | 2 | 10 | Ethanol | — | — | — |
| Example 8 | 4 | 7 | Ethanol | — | — | — |
| Example 9 | 5 | 10 | Ethanol | — | — | — |
| Example 10 | 3 | 7 | Methanol | — | — | — |
| Example 11 | 3 | 7 | Isopropanol | — | — | — |
| Exam le 12 | 3 | 7 | n-butanol | — | — | — |
| Exam le 13 | 3 | 7 | tert-butanol | — | — | — |
| Example 14 | 3 | 7 | Ethanol/ isopropanol | — | — | — |
| Example 15 | 3 | 8 | Ethanol/ isopropanol | — | — | — |
| Example 16 | 1.5 | 10 | Ethanol | — | — | — |
| Example 17 | 1.5 | 20 | Ethanol | — | — | — |
| Example 18 | 1.5 | 40 | Ethanol | — | — | — |
| Comparative Example 1 | 0 | 10 | Ethanol | — | — | — |

TABLE 1-continued

| | | | | | | |
|---|---|---|---|---|---|---|
| Comparative Example 2 | 2 | 0 | — | — | — | — |
| Comparative Example 3 | 3 | 70 | Ethanol | — | — | — |
| Comparative Example 4 | 3 | 0 | — | 0 | 7 | Ethanol |
| Comparative Example 5 | 3 | 0 | — | 0 | 99.5 | Ethanol |
| Comparative Example 6 | 3 | 0 | — | 0 | 99.5 | Ethanol |
| Comparative Example 7 | 1.5 | 0 | — | — | — | — |

| | Evaluations | | | | |
|---|---|---|---|---|---|
| | Single-Piece Transmittance (%) | Degree of Polarization (%) | Crossed Transmittance (%) | | |
| | | | Tc450 | Tc550 | Tc660 |
| Example 1 | 44.00 | 99.97 | 0.031 | 0.012 | 0.023 |
| Example 2 | 44.17 | 99.92 | 0.091 | 0.032 | 0.043 |
| Example 3 | 44.10 | 99.95 | 0.063 | 0.022 | 0.020 |
| Example 4 | 44.05 | 99.95 | 0.024 | 0.020 | 0.086 |
| Example 5 | 44.30 | 99.86 | 0.108 | 0.060 | 0.127 |
| Example 6 | 44.15 | 99.91 | 0.138 | 0.033 | 0.027 |
| Example 7 | 44.20 | 99.90 | 0.128 | 0.040 | 0.040 |
| Example 8 | 44.08 | 99.94 | 0.043 | 0.026 | 0.086 |
| Example 9 | 44.21 | 99.88 | 0.045 | 0.050 | 0.182 |
| Example 10 | 44.00 | 99.96 | 0.025 | 0.015 | 0.043 |
| Example 11 | 44.03 | 99.96 | 0.030 | 0.014 | 0.029 |
| Exam le 12 | 44.08 | 99.96 | 0.021 | 0.015 | 0.054 |
| Exam le 13 | 44.10 | 99.96 | 0.032 | 0.016 | 0.040 |
| Example 14 | 44.02 | 99.95 | 0.039 | 0.019 | 0.043 |
| Example 15 | 44.02 | 99.96 | 0.033 | 0.015 | 0.033 |
| Example 16 | 43.89 | 99.85 | 0.187 | 0.049 | 0.051 |
| Example 17 | 44.00 | 99.80 | 0.149 | 0.076 | 0.167 |
| Example 18 | 44.05 | 99.75 | 0.053 | 0.082 | 0.602 |
| Comparative Example 1 | 44.00 | 99.55 | 1.650 | 0.040 | 0.003 |
| Comparative Example 2 | 44.00 | 99.88 | 0.216 | 0.038 | 0.021 |
| Comparative Example 3 | 44.16 | 99.88 | 0.019 | 0.040 | 0.335 |
| Comparative Example 4 | 43.86 | 99.73 | 1.208 | 0.017 | 0.002 |
| Comparative Example 5 | 44.47 | 99.59 | 0.084 | 0.156 | 0.781 |
| Comparative Example 6 | 44.19 | 99.83 | 0.021 | 0.057 | 0.439 |
| Comparative Example 7 | 43.80 | 99.88 | 0.197 | 0.034 | 0.022 |

In Table 1, the mixing ratio of ethanol to isopropyl alcohol is 90:10 (in weight ratio).

The examples all satisfy a single-piece transmittance of 44.0% or more, a degree of polarization of 99.8% or more, and a crossed transmittance of 0.20% or less at wavelengths of 450 nm, 550 nm and 660 nm, which indicates that a polarizer having a high level of both transmittance and degree of polarization in a wide band was obtained in each of the examples. In particular, Examples 1, 2, 3, 4 and 8 each satisfy a single-piece transmittance of 44.0% or more and a degree of polarization of 99.9% or more and a crossed transmittance of 0.10% or less at wavelengths of 450 nm, 550 nm and 660 nm, and, therefore, the polarizer of each of these examples has an excellent level of both transmittance and degree of polarization in a wide band.

Examples 16 to 18 and Comparative Example 7

Polarizers were prepared under the same conditions as in Example 1, except that the potassium iodide concentration and the ethanol concentration of the aqueous solution used as the treatment liquid in the first washing bath were changed as shown in Table 1.

The optical properties of the resulting polarizers were determined in the same manner. The results are shown in Table 1.

(Preparation of Polarizing Plate)

A polarizing plate was prepared using the polarizer obtained in each of Examples 16 to 18 and Comparative Example 7.

A 30 μm-thick lactonized poly(methyl methacrylate) film was used as a transparent protective film.

A mixture of 40 parts by weight of N-acryloylmorpholine and 60 parts by weight of hydroxyethylacrylamide was used as an adhesive.

The adhesive was applied to one side of the transparent protective film with a micro-gravure coater (gravure roll: #300) so that a 5 μm-thick-adhesive-coated transparent protective film was obtained. The adhesive-coated transparent protective film was bonded to both sides of the polarizer with a roller machine. Electron beams were applied to the transparent protective film side of the resulting laminate (both sides) so that a polarizing plate composed of the polarizer and the transparent protective films placed on both sides thereof was obtained. The line speed, the acceleration voltage and the exposure dose were 15 m/minute, 200 kV and 20 kGy, respectively.

The anti-cracking properties of the resulting polarizing plate were evaluated as described below. The results are shown in Table 2.

<Anti-Cracking Properties>

The resulting polarizing plate was cut into a 150 mm-long, 50 mm-wide piece. The piece was subjected to 150 cycles of cooling at −40° C. for 1 hour and heating at 85° C. for 1 hour. After the 150 cycles were completed, the area ($\mu m^2$) of cracks generated was measured.

TABLE 2

|  | Anti-Cracking Properties (Crack Area ($\mu m^2$)) |
| --- | --- |
| Example 16 | 2.50 |
| Example 17 | 2.00 |
| Example 18 | 0.00 |
| Comparative Example 7 | 6.67 |

The invention claimed is:

1. A method for producing a polarizer, comprising:
subjecting a polyvinyl alcohol film to at least a dyeing process, a crosslinking process and a stretching process; and
then subjecting the polyvinyl alcohol film to a washing process with an aqueous solution containing 1 to 30% by weight of an alcohol and 2 to 10% by weight of an iodide compound.

2. The method for producing a polarizer according to claim 1, wherein the alcohol is at least one alcohol having 1 to 4 carbon atoms.

3. The method for producing a polarizer according to claim 1, wherein the dyeing process comprises an aqueous solution containing iodine.

4. The method for producing a polarizer according to claim 1, wherein the crosslinking process is performed twice.

5. The method for producing a polarizer according to claim 1, wherein the crosslinking process contains a boron compound as a crosslinking agent.

6. The method for producing a polarizer according to claim 1, wherein the crosslinking process is performed at the same time as the stretching process.

7. The method for producing a polarizer according to claim 1, wherein the stretching process is a uniaxial stretching process.

8. The method for producing a polarizer according to claim 1, wherein the polyvinyl alcohol film has a stretch ratio of 3 to 17 times the original length after undergoing the stretch process.

9. The method for producing a polarizer according to claim 1, wherein a swelling process is performed prior to the dyeing step.

10. The method for producing a polarizer according to claim 1, wherein the alcohol is selected from a group consisting of methanol, ethanol, n-propanol, isopropanol, n-butanol, isobutanol, sec-butanol, and tert-butanol and mixtures thereof.

11. The method for producing a polarizer according to claim 1, wherein the aqueous solution contains 2 to 30% by weight of an alcohol.

12. The method for producing a polarizer according to claim 1, wherein the aqueous solution contains 3 to 20% by weight of an alcohol.

13. The method for producing a polarizer according to claim 1, wherein the aqueous solution contains 5 to 10% by weight of an alcohol.

14. The method for producing a polarizer according to claim 2, wherein the aqueous solution contains 1 to 5% by weight of an iodide compound.

15. The method for producing a polarizer according to claim 1, wherein the aqueous solution contains 2 to 4% by weight of an iodide compound.

16. The method for producing a polarizer according to claim 1, wherein the after the washing process, the polyvinyl alcohol film is subjected to a drying process.

* * * * *